United States Patent [19]

Schreffler et al.

[11] 4,341,819
[45] Jul. 27, 1982

[54] EPOXY COATING POWDERS WITH WRINKLE FINISHES

[75] Inventors: Dean A. Schreffler, Hamburg; Charles M. Noonan, Bernville, both of Pa.

[73] Assignee: The Polymer Corporation, Reading, Pa.

[21] Appl. No.: 220,709

[22] Filed: Dec. 29, 1980

[51] Int. Cl.³ .......................... B05D 5/02; B05D 5/00
[52] U.S. Cl. .................................... 427/195; 427/257; 528/100; 525/533
[58] Field of Search ....................... 528/100; 525/533; 427/195, 257

[56] References Cited

U.S. PATENT DOCUMENTS 4,031,051  6/1977  Dowbenko .......................... 528/100
4,264,758  4/1981  Waddill .............................. 528/100

FOREIGN PATENT DOCUMENTS 48-84199  4/1973  Japan .

OTHER PUBLICATIONS

Powder Coating, Industrial Finishing, Corda, 10/1975, pp. 5, 7 and 8.

Primary Examiner—Shrive P. Beck
Attorney, Agent, or Firm—Richard O. Church

[57] ABSTRACT

An epoxy coating powder applied in a fusion coating process that yields a low gloss, wrinkled finish. The coating composition is a heat reactive epoxy resin in which the wrinkled finish results from the use of methylene disalicylic acid as the curing agent for the epoxy resin.

4 Claims, 1 Drawing Figure

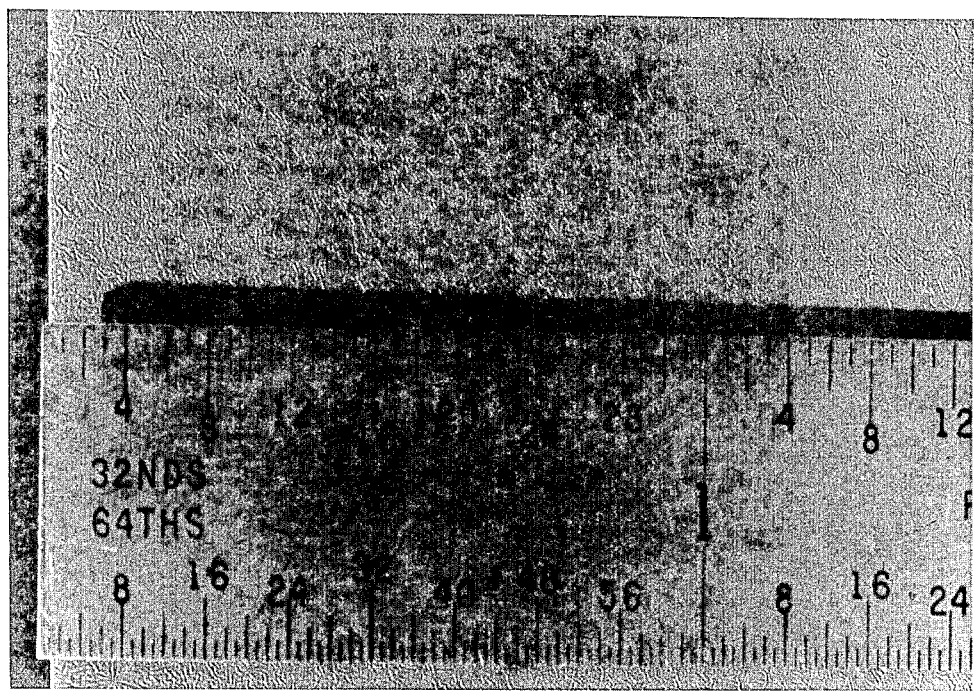

EPOXY COATING POWDERS WITH WRINKLE FINISHES

TECHNICAL FIELD

This invention relates to coatings applied by fusion coating processes and more particularly to epoxy coating powders that yield wrinkled finishes.

BACKGROUND ART

The coating compositions of this invention are dry, free flowing powders that may be used in fusion coating processes. "Fusion coating processes" are here defined as those coating processes in which coating powders are distributed over a substrate (which may be hot or cold) and heat, supplied from the substrate or an external source, fuses the powders into a continuous film. Examples of fusion coating processes include fluidized bed, electrostatic spraying, hot flocking (with or without electrostatic spray), and cloud chambers. When coating powders are based upon heat curing resins, as is the case of the epoxy resins of this invention, sufficient heat in excess of that required to fuse the powders must be available to cure the coatings and fully develop their physical and chemical properties.

The coating compositions of this invention are distinguished in that when coated onto a substrate, they produce coatings of low gloss with a randomly developed wrinkled surface. Wrinkled surfaces of this type are desired in many applications and are commonly applied to office equipment such as typewriters, staplers, dictating equipment, file cabinets, and the like. In addition to being asthetically pleasing, these finishes have certain utilitarian functions in that they are of low gloss (i.e., not shiny), they do not show scratches, and they hide surface defects of a substrate even when applied in thin films.

Wrinkle finishes conventionally are applied from solvent-based paints, usually using two coats, to establish a compound system in which the surface sets up first. When the rest of the coating sets up, the resulting shrinkages deform the previously set surface and cause a fine wrinkle pattern to develop on the surface of the coating.

DISCLOSURE OF THE INVENTION

Accordingly, it is the object of this invention to formulate epoxy coating powders which will yield coatings having a low gloss and a randomly developed wrinkled pattern on the surface.

These and other objects of this invention are achieved through the use of methylene disalicylic acid as the curing agent. Otherwise the formulation of the heat curable epoxy coating powder is somewhat typical of a standard decorative epoxy coating except that special care must be taken to adjust the rate of cure (gel time) and the melt viscosity.

An essential property that must be considered when formulating a coating powder is the ability of the powder to fuse into a uniform, continuous and void free film. As a guide to formulation chemists, two relatively simple test procedures have been established to measure the ability of a coating powder to fuse over a substrate. One of these is gel time which provides a measure of the reactivity of a given system; and the other is inclined plate flow which is a combined measure of both the reactivity and melt viscosity of the coating powder.

ASTM Specification D-3451 (14) defines a procedure for measuring gel time in which a piece of aluminum foil is placed on a hot plate and heated to a given temperature, e.g. 190° C. A small quantity of powder is dropped onto the heated foil and stroked with a tongue depressor until continuous and readily breakable filaments are formed when the depressor is lifted from the foil. The elapsed time for this to occur is measured in seconds and is the gel time.

The Inclined Plate Flow Test is defined in ASTM D-3451 (17). In this test a small pellet of powder is placed on a glass or tin plate and inserted into a heated oven, e.g. 150° C. After the pellets and the plate have reached temperature equilibrium, the oven rack on which the plate rests is tilted to a 65° angle without opening the oven. After 30 minutes, the plate is removed from the oven, allowed to cool to room temperature and the length of the flow measured in millimeters. The distance the coating flows is dependent on the initial melt viscosity, rate of reaction, and the temperature at which the test is conducted. If the flow is too great, the coating may be expected to run and sag on a substrate; on the other hand, if the flow is too small, a rough, discontinuous, nonadherent film will probably result.

To obtain the desired wrinkled finish, it has been found that the gel time should be adjusted to be in a range of from about 30 to 70 seconds when measured at 205° C. and the inclined plate flow should be in a range of from about 50 to 80 mm when measured at 150° C. If the gel time or the inclined plate flow does not fall within these limits, the desired wrinkled finishes of this invention are not obtained.

It is generally true that the gel time and the inclined plate flow are a direct function of molecular weight and functionality of the epoxy resin. Melt viscosity and the inclined plate flow are also influenced by fillers which generally increase the viscosity depending on the amount used, the particle size, the surface area and the surface chemistry of the fillers. By judiciously balancing the functionality and the molecular weight of the resin in combination with the selection of the curing agent, catalyst system, and fillers, it is well within the skill of a formulating chemist to arrive at a coating powder that has gel times and inclined plate flows that will be useful in the practice of this invention.

In the examples that follow, the epoxy resins used are type 3, low viscosity epoxy resins. More specifically, they are epoxies of the epichlorohydrinbisphenol-A type having epoxy equivalent weights of from about 600 to 750, a functionality of about 2, and a Gardner-Holdt viscosity in a range of from about K to L. The preferred catalyst is a Lewis acid type and in the examples a boron trichloride amine complex was used. The curing agent, which is critical in the practice of this invention, is methylene disalicylic acid and is used in approximately stoichiometric quantities. Having defined the above parameters, final adjustment of the gel time and inclined plate flow was obtained by the selection of the kind and amount of fillers, including the pigments, used in the system.

EXAMPLE I

A coating powder was prepared in accordance with this invention by initially blending the following ingredients:

|   | Material | Phr* |
|---|---|---|
| 1. | Epoxy low viscosity-type 3 (Dow XD-9046) | 85 |
| 2. | Epoxy type 3 with 5% polyalkylacrylate flow promoter (Shell DRH-203) | 15 |
| 3. | Methylene Disalicylic Acid (Tenneco) | 18 |
| 4. | Sparmite (BaSO₄) filler | 50 |
| 5. | Carbon black filler (City Service Raven #22) | 3 |
| 6. | BCl₃ amine catalyst (Ciba Geigy XU-213) | 0.5 |

*Phr is used herein to designated parts by weight per hundred parts resin.

The above materials were melt-mixed in an extruder and the extrudate chopped and ground to a fine powder that was passed through a 60 mesh screen (U.S. standard).

Precleaned steel test panels (from "Q" Panel Co.) of about 3"×6"×0.032" (7.6 cm×15.2 cm×0.08 cm) were coated using standard electrostatic spray techniques and baked in an oven at a temperature of about 190° C. for 10 minutes. There is no great criticality to the time and temperature of the cure and quite generally a useful range with the above formulation is from about 150° C. at 20 minutes to about 200° C. for 10 minutes.

Samples so prepared had a gloss in the range of from 0 to 10% and a well-developed, random, finely-wrinkled surface.

EXAMPLE II

The following ingredients were mixed, a coating powder was prepared and panels were coated in a manner identical to Example I.

|   | Material | Phr* |
|---|---|---|
| 1. | Epoxy low viscosity, type 3 (Dow XD-9046) | 85 |
| 2. | Epoxy type 3 with 5% polyalkylacrylate flow promoter (Shell DRH-203) | 15 |
| 3. | Methylene Disalicylic Acid (Tenneco) | 18 |
| 4. | TiO₂ pigment (DuPont R-900) | 40 |
| 5. | Black pigment (DeGussa FW-200) | 0.7 |
| 6. | Blue pigment (Whittiker Clark UB-5005) | 0.5 |
| 7. | BCl₃ amine catalyst (Ciba Geigy XU-213) | 0.5 |

The difference between this example and Example I is that the color of the coating was changed from the black of Example I to a gray-blue by the use of a differenct pigment system. Note that since in this Example II a high concentration of pigment was required (41.2 phr) no other filler was needed to obtain desired incline plate flow and gel time. This contrasts of Example I where the pigments used totalled only 3.5 phr and it was necessary to add 50 phr of barium sulphate filler to bring the inclined plate flow and gel time within acceptable limits.

The surface characteristics of the coating of this Example II were the same as those of Example I with the exception, of course, that they were of a different color.

The FIGURE is an enlargement of a photograph taken of a panel coated with the powder of Example II. The ruler indicates the degree of enlargement.

We claim:

1. A powdered coating composition adapted to provide a wrinkled finish, comprised of a heat reactive epoxy resin, a curing agent, a catalyst, and fillers, the improvement being that the curing agent is methylene disalicyclic acid.

2. A powdered coating composition according to claim 1 wherein the inclined plate flow is in a range of from about 50 to 80 mm.

3. A powdered coating composition according to claim 1 in which the gel time is in a range of from about 30 to 70 seconds.

4. A method for obtaining a wrinkled surface when coating a substrate in fusion coating processes with heat reactive epoxy resins, the improvement comprising the use of methylene disalicylic acid as the curing agent.

* * * * *